US 11,480,794 B2

(12) United States Patent
Haseltine et al.

(10) Patent No.: US 11,480,794 B2
(45) Date of Patent: Oct. 25, 2022

(54) COMPACT AUGMENTED REALITY (AR)-CAPABLE DISPLAY WITH INCREASED FIELD OF VIEW

(71) Applicant: Disney Enterprises, Inc., Burbank, CA (US)

(72) Inventors: Eric C. Haseltine, Silver Spring, MD (US); Quinn Yorklun Jen Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 186 days.

(21) Appl. No.: 16/781,899

(22) Filed: Feb. 4, 2020

(65) Prior Publication Data

US 2021/0239980 A1 Aug. 5, 2021

(51) Int. Cl.
*G02B 27/01* (2006.01)
*G02F 1/1335* (2006.01)

(52) U.S. Cl.
CPC ... *G02B 27/0172* (2013.01); *G02F 1/133528* (2013.01); *G02B 2027/0178* (2013.01); *G02F 1/133541* (2021.01)

(58) Field of Classification Search
CPC ...... G03B 21/008; G03B 21/28; G03B 21/56; G03B 21/62; G03B 21/142; G03B 21/208; G02B 2027/0123; G02B 2027/0165; G02B 2027/0172; G02B 2027/0178; G02B 27/01; G02B 27/017; G02B 27/0101; G02B 27/0172; G02B 27/106; G02F 1/133528; G02F 1/133541
See application file for complete search history.

(56) References Cited

U.S. PATENT DOCUMENTS

| | | | | |
|---|---|---|---|---|
| 9,927,619 | B2* | 3/2018 | Wang | G02B 27/0176 |
| 10,885,819 | B1* | 1/2021 | Verbeke | G02B 27/01 |
| 2006/0181769 | A1* | 8/2006 | Kumasawa | G03B 21/62 |
| | | | | 359/449 |
| 2012/0162753 | A1* | 6/2012 | Tatsuno | G02B 17/08 |
| | | | | 359/364 |
| 2014/0146295 | A1* | 5/2014 | Tatsuno | G03B 21/147 |
| | | | | 353/98 |
| 2014/0347736 | A1* | 11/2014 | Liu | G02B 27/0172 |
| | | | | 359/630 |
| 2017/0195653 | A1* | 7/2017 | Trail | H04N 13/344 |
| 2019/0285939 | A1* | 9/2019 | Lee | G02F 1/133526 |
| 2020/0301139 | A1* | 9/2020 | Lin | G02B 27/286 |

* cited by examiner

*Primary Examiner* — Sultan Chowdhury
(74) *Attorney, Agent, or Firm* — Patterson + Sheridan, LLP

(57) ABSTRACT

Aspects described herein include an optical arrangement that defines a field of view relative to an optical reference point. The optical arrangement comprises a reflective element arranged within the field of view, an off-axis, short-throw projector arranged outside the field of view, and a substantially transparent projection screen arranged within the field of view. The projection screen is configured to preferentially direct imagery projected by the off-axis, short-throw projector toward the reflective element, and to, after direction by the reflective element, transmit the imagery toward the optical reference point.

21 Claims, 7 Drawing Sheets

COMPACT AUGMENTED REALITY (AR)-CAPABLE DISPLAY WITH INCREASED FIELD OF VIEW

BACKGROUND

The present disclosure generally relates to computer-based entertainment, and more specifically to implementations of augmented reality (AR)-capable devices providing increased fields of view.

Many AR-capable devices often have a narrow field of view due to the mechanism used for combining virtual imagery with physical imagery. For example, AR-capable devices using fold optics (e.g., a planar beamsplitter) may require relatively more space to position the fold optics, which tends to increase a distance that a viewer's eye can be to an imaging eyepiece. Generally, the further away that the viewer's eye is from the imaging eyepiece, the subtended angle of the eyepiece will be smaller, and the field of view created by the optics will be smaller. Other AR-capable devices may use waveguide image combiners, which tend to position the imaging eyepiece closer to the viewer's eye. However, because waveguide image combiners operate using the principle of total internal refraction (TIR), the acceptance angle, and thus the field of view, is limited.

As a result, AR-capable devices tend to have a field of view limited to about 50 degrees, which is significantly less than direct-view virtual reality (VR) displays having fields of view of 90 degrees or more. The limited field of view in AR-capable devices tends to create "artificial windowing" and "framing" effects, in which the viewer sees more of the physical world than the virtual world. These effects preclude a seamless combination of the real and virtual worlds, which tends to disrupt the sense of immersion for the viewer.

SUMMARY

In one embodiment, an optical arrangement defines a field of view relative to an optical reference point. The optical arrangement comprises a reflective element arranged within the field of view, an off-axis, short-throw projector arranged outside the field of view, and a substantially transparent projection screen arranged within the field of view. The projection screen is configured to preferentially direct imagery projected by the off-axis, short-throw projector toward the reflective element, and to, after direction by the reflective element, transmit the imagery toward the optical reference point.

In another embodiment, an augmented reality (AR)-capable headset comprises one or more visual sensors, one or more computer processors communicatively coupled with the one or more visual sensors, and an optical arrangement defining a field of view relative to an optical reference point. The optical arrangement comprises a reflective element arranged within the field of view, an off-axis, short-throw projector arranged outside the field of view and communicatively coupled with the one or more computer processors, and a substantially transparent projection screen arranged within the field of view. The projection screen is configured to preferentially direct imagery projected by the off-axis, short-throw projector toward the reflective element, and to transmit, toward the optical reference point, the imagery after direction by the reflective element.

In another embodiment, a method is disclosed for use with an augmented reality (AR)-capable headset defining a field of view relative to an optical reference point. The method comprises projecting, from an off-axis, short-throw projector outside the field of view, imagery toward a substantially transparent projection screen arranged within the field of view. The method further comprises, using the projection screen, preferentially directing the imagery toward a reflective element arranged within the field of view. The method further comprises directing, using the reflective element, the imagery toward the optical reference point.

BRIEF DESCRIPTION OF THE DRAWINGS

So that the manner in which the above recited aspects are attained and can be understood in detail, a more particular description of embodiments described herein, briefly summarized above, may be had by reference to the appended drawings. It is to be noted, however, that the appended drawings illustrate typical embodiments and are therefore not to be considered limiting; other equally effective embodiments are contemplated.

DETAILED DESCRIPTION

Embodiments described herein include an optical arrangement defining a field of view relative to an optical reference point. The optical arrangement comprises an off-axis, short-throw projector arranged outside the field of view, and a substantially transparent projection screen arranged within the field of view. The projection screen is configured to preferentially direct imagery projected by the off-axis, short-throw projector toward a reflective element within the field of view, and, after direction of the imagery by the reflective element, transmit, the imagery toward the optical reference point.

Using the combination of the off-axis, short-throw projector and the projection screen, the optical arrangement does not require fold optics, which permits the viewer's eyes to be positioned closer to the reflective element and thereby increases the field of view of the optical arrangement. Some embodiments of the optical arrangement include optical elements providing a refractive power, which further permits the viewer's eyes to be positioned closer to the reflective element.

Figure 1:
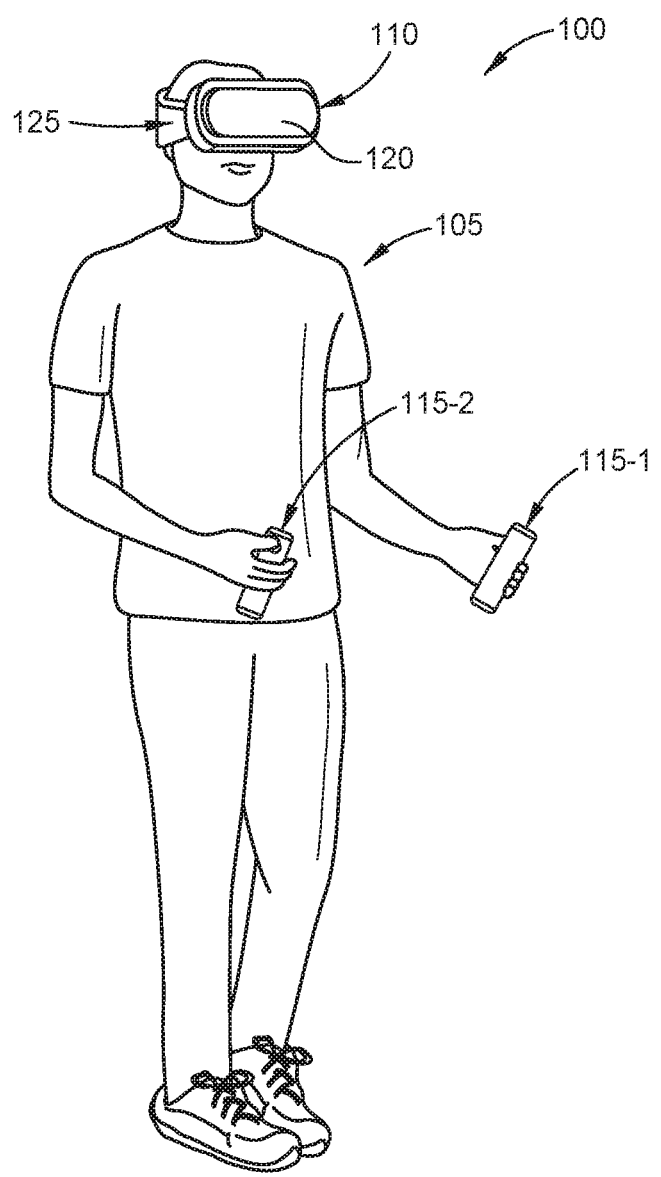
FIG. 1 illustrates exemplary operation of an AR-capable headset and visually detected controller devices, according to one or more embodiments.

FIG. 1 illustrates exemplary operation of an AR-capable headset 110 (also referred to herein as "headset 110") and visually detected controller devices 115-1, 115-2, according to one or more embodiments. In diagram 100, a user 105 wears the headset 110 on his/her head, and holds controller devices 115-1, 115-2 in his/her hands. The headset 110 comprises a lens 120 positioned in front of the eyes of the user 105, and a strap 125 attached to the lens 120 and configured to retain the headset 110 on the head of the user 105 in the desired position.

A display (not shown) of the headset 110 displays visual content that is viewed by the user 105. One or more computer processors (not shown) of the headset 110 may execute one or more applications that provide the visual content to be displayed by the display. One or more visual sensors (not shown) of the headset 110 acquire imagery of a portion of the physical environment surrounding the user 105. In some embodiments, the one or more visual sensors visually detect the controller devices 115-1, 115-2. The one or more computer processors may receive user input that may be used to interactively adapt the visual content. The user input may be received from the controller devices 115-1, 115-2, e.g., by the user moving the controller devices 115-1, 115-2 (whether visually detected by the one or more visual sensors, responsive to signals from sensors of the controller devices 115-1, 115-2, etc.), pressing buttons of the controller devices 115-1, 115-2, and so forth.

In some embodiments, the display, the one or more computer processors, and the one or more visual sensors are integrated into, and not removable from, the headset 110. However, in other embodiments, one or more of the display, the one or more computer processors, and the one or more visual sensors are removably attached to the headset 110.

Figure 2:
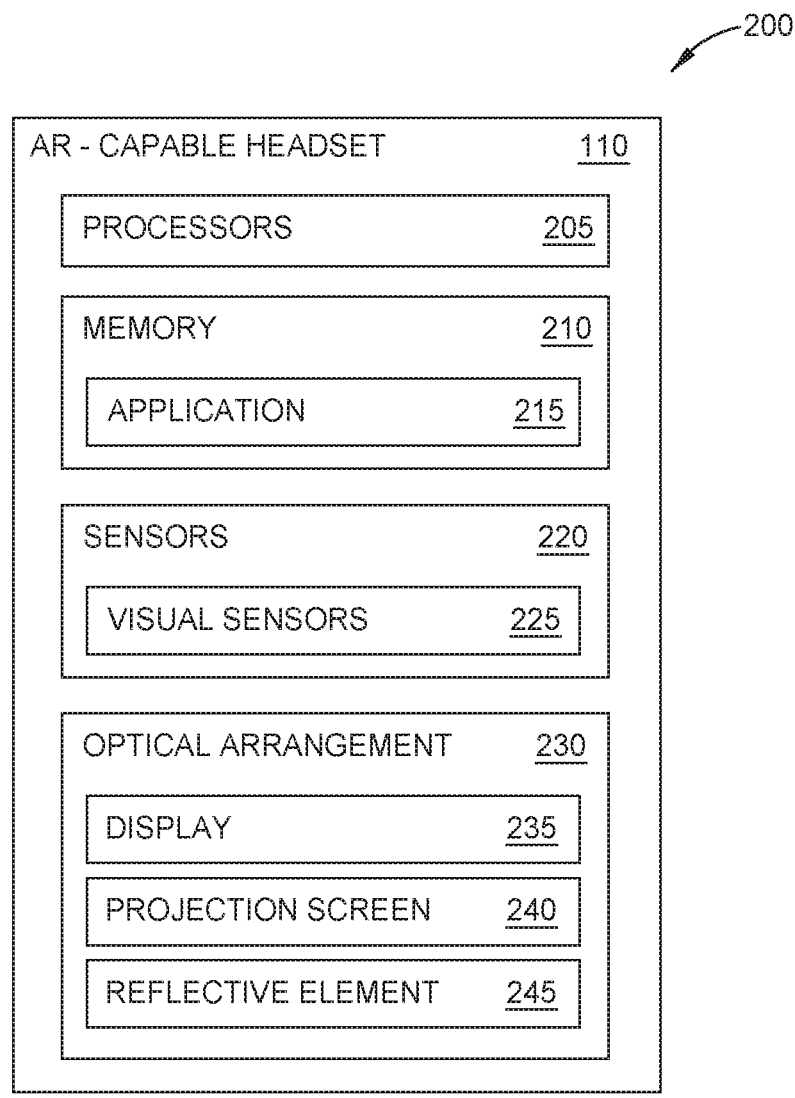
FIG. 2 is a block diagram of an exemplary AR-capable headset, according to one or more embodiments.

FIG. 2 is a block diagram 200 of an exemplary AR-capable headset 110, according to one or more embodiments. The features illustrated in the block diagram 200 may be used in conjunction with other embodiments.

The headset 110 comprises one or more computer processors 205 (also referred to herein as "processors 205") and a memory 210. The one or more computer processors 205 may be implemented in any suitable form, such as a general purpose microprocessor, a controller, an application-specific integrated circuit (ASIC), and so forth. The memory 210 may include a variety of computer-readable media selected for their size, relative performance, or other capabilities: volatile and/or non-volatile media, removable and/or non-removable media, etc.

The memory 210 may include one or more applications (or modules) for performing various functions described herein. In one embodiment, each application or module includes program code that is executable by the one or more processors 205. However, other embodiments may include applications or modules that are partially or fully implemented in hardware (i.e., circuitry) or firmware of the headset 110. As shown, the memory 210 comprises an application 215 that generates visual content to be displayed by the headset 110. The visual content may be generated based on a determined state of the headset 110 (e.g., worn or unworn, docked, etc.), based on objects detected by sensors 220 within the physical environment, based on inputs received from the controller devices 115-1, 115-2 of FIG. 1, and so forth. For example, the application 215 may be implemented as a game providing a dynamic gameplay environment for one or more users, and may have any suitable form such as an action game, an adventure game, a role-playing game, a simulation game, a strategy game, a sports game, a party game, a trivia game, an educational game, and so forth. In another example, the application 215 may be implemented as a streaming media application.

The headset 110 further comprises one or more sensors 220 communicatively coupled with the one or more processors 205. Sensor signals from the one or more sensors 220 may be used as input by the one or more computer processors 205 to determine the state of the headset 110, to interactively adapt the visual content generated by the application 215, and so forth. The one or more sensors 220 may be implemented in any form. In some embodiments, the one or more sensors 220 comprise one or more visual sensors 225 having any suitable implementation, such as a visual camera or an infrared camera. For example, the one or more visual sensors 225 may comprise a camera having a forward-oriented field of view when the headset 110 is in a worn state (e.g., the camera is generally aligned with the viewer's natural field of view). In some embodiments, the one or more sensors 220 further comprise a worn-state sensor indicating whether the headset 110 is being worn. Some examples of the worn-state sensor include a sensor that detects contact with a wearer's face, a photodetector that receives light from an LED when the headset 110 is not being worn (e.g., the wearer's face is not blocking the path between the LED and photodetector), and so forth. Other types of sensors are also contemplated for the one or more sensors 220, such as a navigation system (e.g., a Global Positioning System receiver), an inertial measurement unit (IMU), and so forth.

The headset 110 further comprises an optical arrangement 230 that defines a field of view relative to an optical reference point. The components of the headset 110 are dimensioned and arranged such that, when the headset 110 is worn by a user, an eye of the user is aligned with the optical reference point. In some embodiments, the optical arrangement 230 defines the field of view relative to multiple optical reference points, such that each eye of the user is aligned with a respective optical reference point.

In some embodiments, the headset 110 transmits light from the physical environment toward the optical reference point. In this way, the headset 110 is capable of operating in an AR state, in which virtual objects such as graphics and/or text may be displayed by the headset 110 within the field of view, and relative to physical objects in the environment.

The optical arrangement 230 further comprises a display 235 communicatively coupled with the one or more processors 205. The display 235 may include any type of dynamic display capable of displaying a visual interface to a wearer of the headset 110.

In some embodiments, the display 235 comprises a projector that is arranged outside of the field of view of the optical arrangement 230. In some embodiments, the projector comprises one of a liquid crystal on silicon (LCOS) display, and a deformable mirror device (DMD).

The projector projects imagery toward a substantially transparent projection screen 240 that is arranged within the field of view. In some embodiments, to achieve an off-axis projection toward the projection screen 240, the projector further comprises one or both of asymmetric aspheric optics, and optics having a f-number that is greater than a threshold value. The asymmetric aspheric optics generally support short-throw off-axis imaging, and the high f-number optics generally achieve a very long depth of field.

The projection screen 240 comprises optical elements that preferentially scatter light such that more of the projected imagery is directed toward a reflective element 245 that is also arranged within the field of view, when compared with an amount of the projected imagery that is reflected (or back-scattered) by the projection screen 240. In some embodiments, the directed portion of the projected imagery is returned from the reflective element 245 with a greater intensity than the back-scattered portion, which causes the directed portion to dominate the back-scattered portion within the user's perception. In some cases, the projection screen 240 preferentially scatters light away from the optical reference point. In other cases, the projection screen 240 preferentially scatters light toward the optical reference point. In some embodiments, the projection screen 240 comprises one of nano-optical elements, a volume hologram, embossed diffractive optical elements, refractive prisms, and refractive lenslets. For example, the projection screen 240 may comprise nanoparticles embedded in a polymer, such as gold or silver nanoparticles (which may or may not be coated) that preferentially scatter certain colors of light.

The reflective element 245 may have any suitable reflection/transmission ratios for directing the projected imagery (after being directed by the projection screen 240) toward the optical reference point. In some embodiments, the reflective element 245 comprises a partially reflective mirror that transmits light from the physical environment toward the optical reference point. In some embodiments, the reflective element 245 comprises a film (e.g., a coating or other reflective material applied to an inner curvature or an outer curvature of the reflective element 245) that defines a partially reflective surface facing the optical reference point. In some embodiments, the reflective element 245 reflects between about 50% and 80% of the incident light (e.g., the projected imagery from the projector), although other ratios of reflection and transmission are also possible. In one particular example, the reflective element 245 reflects about 67% of the incident light.

In some embodiments, the projection screen 240 is arranged between the reflective element 245 and the optical reference point. In this configuration, the projection screen 240 preferentially scatters the projected imagery away from the optical reference point. The reflective element 245 reflects the projected imagery toward the projection screen 240. The projection screen 240 transmits the imagery (after reflection by the reflective element 245) toward the optical reference point.

With the first incidence of the projected imagery on the projection screen 240, the light of the projected imagery is preferentially scattered toward the reflective element 245. A relatively small portion of the light is back-scattered by the projection screen 240 toward the optical reference point. The forward-scattered light is reflected by the reflective element 245 toward the optical reference point, such that the projected imagery has a second incidence on the projection screen 240. The projection screen 240 then transmits a majority of the second incidence toward the optical reference point. In some embodiments, the projection screen 240 is arranged at or near a focal length of a lens (or "eyepiece") of the optical arrangement 230, and the forward-scattered light is reflected by the reflective element 245 as collimated light. The collimated light passing through the projection screen 240 will have a greater intensity than that of the back-scattered light. As a result, the user's perception of the collimated light will achieve "sensory gain control" (e.g., according to Weber and Fechner's laws of perception), and the user's perception of the back-scattered light will be suppressed. Additionally, due to the greater intensity, the user will naturally focus on the collimated light, which tends to make the back-scattered light less perceptually distinct (e.g., blurred).

In other embodiments, the reflective element 245 is arranged between the projection screen 240 and the optical reference point. In this configuration, the reflective element 245 transmits the projected imagery, along with light from the physical environment, toward the optical reference point. In some embodiments, the projector projects polarized imagery and the projection screen 240 preserves a polarization of the polarized imagery. For example, the projection screen 240 may comprise a metallic or metallized film that tends to preserve the polarization of the polarized imagery. In these cases, the optical arrangement 230 may comprise additional optical elements, such as a circular polarizing filter arranged between the reflective element 245 and the optical reference point, and a quarter-wave retarder arranged between the reflective element 245 and the circular polarizing filter. Using the polarized imagery, the optical arrangement 230 may provide a greater proportion of the projected light to the optical reference point.

In some alternate embodiments, instead of a projector arranged outside of the field of view of the optical arrangement 230, the display 235 may be a transparent display arranged within the field of view. Some non-limiting examples of the transparent display include an organic light-emitting diode (OLED), a side-lit liquid crystal display (LCD), and a naturally-lit LCD.

Regardless of the implementation of the display 235, some embodiments of the optical arrangement 230 may include optical elements providing a refractive power, which further permits the viewer's eyes to be positioned closer to the lens or eyepiece of the optical arrangement 230. For example, the optical arrangement 230 may comprise a first lens, with a positive refractive power, that is arranged between the reflective element 245 and the optical reference point, such that the projected imagery makes two passes through the first lens before reaching the optical reference point. In some embodiments, the reflective element 245 (e.g., the partially reflective mirror) also has a positive refractive power. The optical arrangement 230 may further comprise a second lens arranged on an opposing side of the reflective element 245 from the first lens. The second lens may have a negative refractive power with a same magnitude as the positive refractive power of the first lens. In this way, the optical arrangement 230 may also direct environmental light to the optical reference point without a net magnification by the first lens and the second lens (in some cases, the environmental light may be magnified by the reflective element 245).

Figure 3:
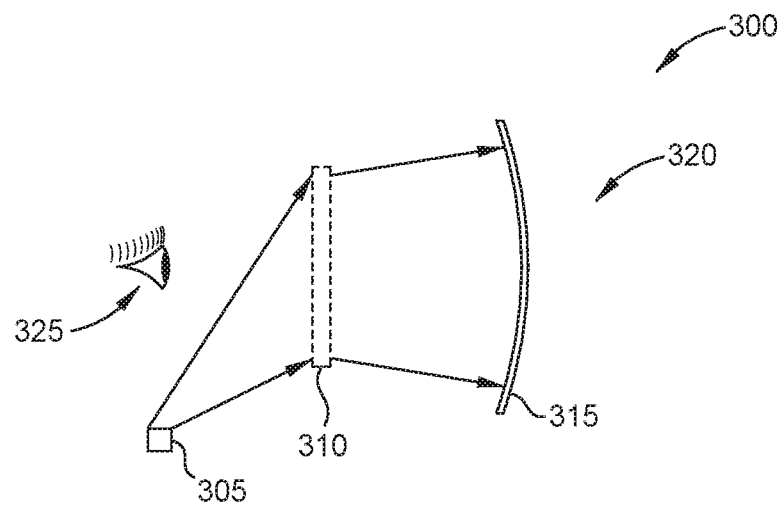
FIG. 3 illustrates an exemplary optical arrangement with a substantially transparent projection screen, according to one or more embodiments.

FIG. 3 illustrates an exemplary optical arrangement 300 with a substantially transparent projection screen 310, according to one or more embodiments. The features of the optical arrangement 300 may be used in conjunction with other embodiments. For example, the optical arrangement 300 represents one example implementation of the optical arrangement 230, in which the projection screen 240 is arranged between the reflective element 245 and the optical reference point.

The optical arrangement 300 comprises an off-axis, short-throw projector 305 (also "projector 305"), the projection screen 310, and a partially reflective mirror 315. The projector 305 represents one example of the display 235 of FIG. 2, the projection screen 310 represents one example of the projection screen 240, and the partially reflective mirror 315 represents one example of the reflective element 245. The projection screen 310 and the partially reflective mirror 315 collectively define a field of view 320 of the optical arrangement 300 relative to an optical reference point, which is shown in FIG. 3 as an eye 325 of a user.

In some embodiments, the projector 305 comprises one of a LCOS display and a DMD, although other suitable implementations of the projector 305 are also contemplated. The projector 305 is arranged outside the field of view 320, and projects imagery toward the projection screen 310. Further, as discussed above with respect to FIG. 2, the projector 305 may comprise one or both of asymmetric aspheric optics, and optics having an f-number that is greater than a threshold value.

Figure 9:
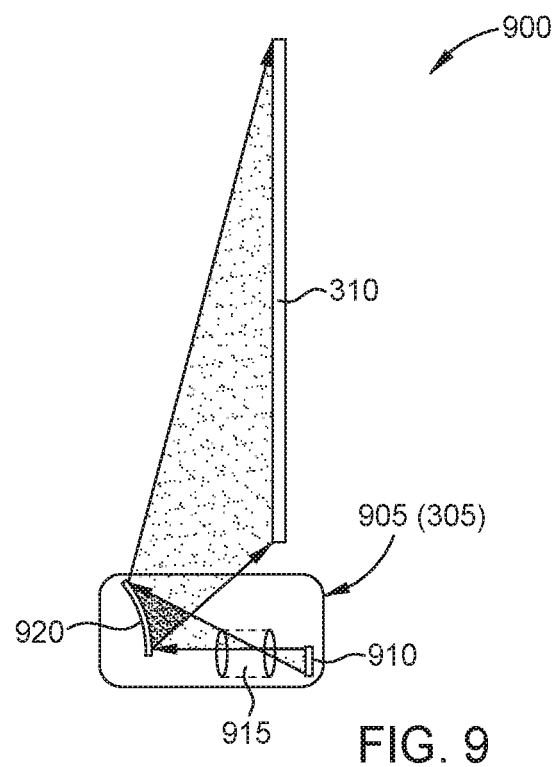
FIG. 9 illustrates an exemplary implementation of an off-axis, short-throw projector having a convex mirror, according to one or more embodiments.
Figure 10:
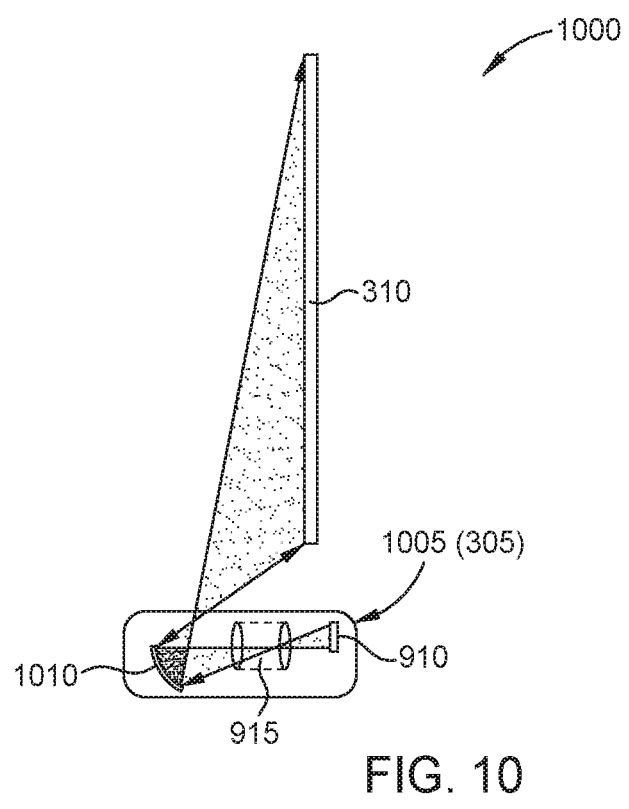
FIG. 10 illustrates an exemplary implementation of an off-axis, short-throw projector having a concave mirror, according to one or more embodiments.
Figure 11:
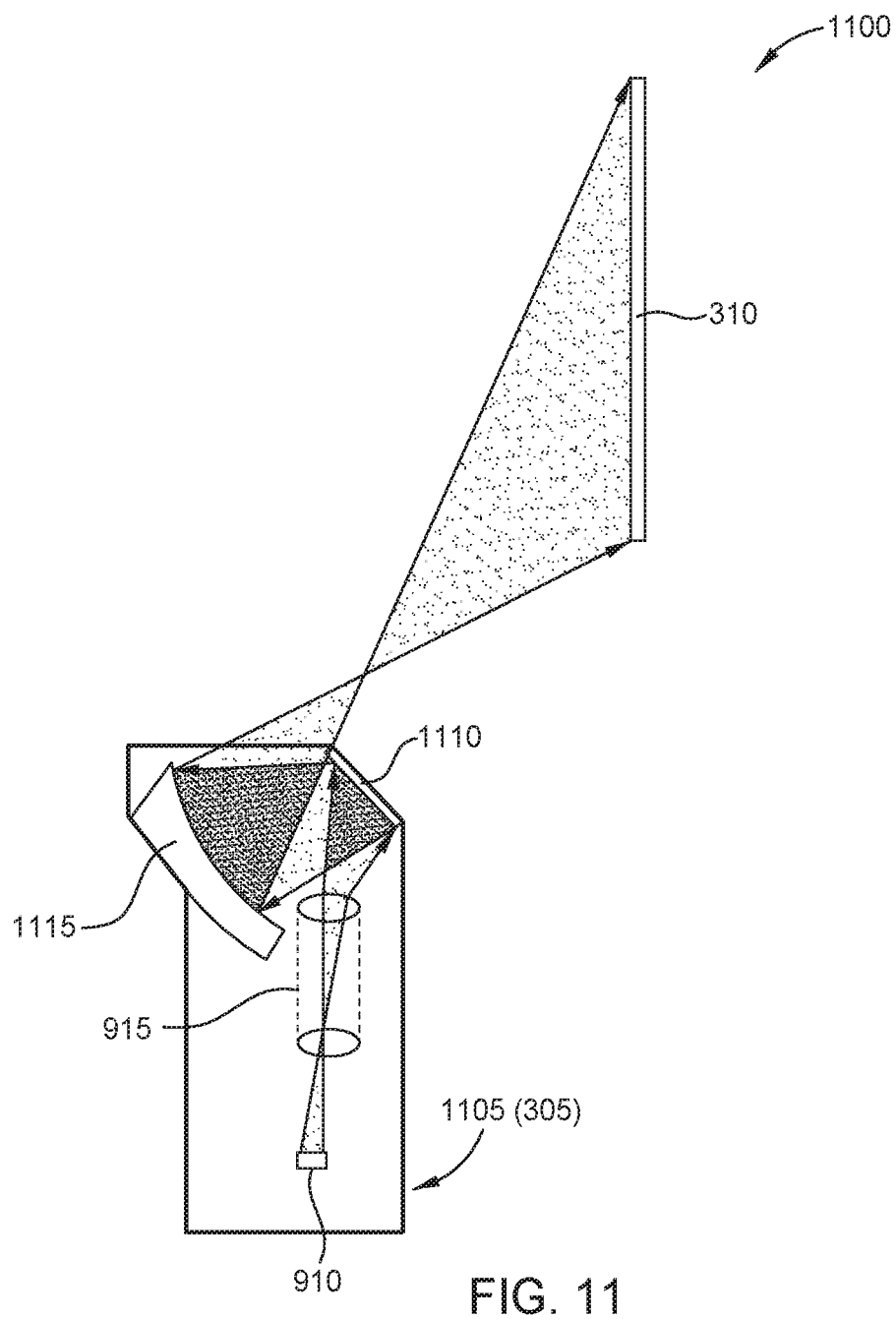
FIG. 11 illustrates an exemplary implementation of an off-axis, short-throw projector having a free-form mirror, according to one or more embodiments.

FIGS. 9-11 illustrate exemplary implementations of the projector 305, although other suitably compact implementations of the projector 305 are also contemplated. In diagram 900 of FIG. 9, the projector 905 comprises a display 910, a lensing arrangement 915, and a convex mirror 920. In some embodiments, the display 910 comprises an LCOS display, although other types of display are also contemplated. The lensing arrangement 915 may comprise one or both of the asymmetric aspheric optics, and optics having an f-number that is greater than the threshold value.

In diagram 1000 of FIG. 10, the projector 1005 comprises the display 910, the lensing arrangement 915, and a concave mirror 1010. Generally, using the concave mirror 1010 supports a more compact implementation of the projector 1005, when compared to projector 905 using the convex mirror 920.

In diagram 1100 of FIG. 11, the projector 1105 comprises the display 910, the lensing arrangement 915, an inflection mirror 1110, and a free-form mirror 1115. The free-form mirror 1115 may have any suitable implementation, such as a high-order odd polynomial mirrored surface. Using the free-form mirror 1115 enables a more compact implementation of the projector 1105 while maintaining suitably high optical performance. Using the inflection mirror 1110 further supports a more compact implementation of the projector 1105. However, other implementations of the projector 1105 may omit the inflection mirror 1110.

Returning to FIG. 3, the projection screen 310 comprises optical elements that preferentially scatter light such that a majority of the projected imagery is directed toward the partially reflective mirror 315, away from the optical reference point. The partially reflective mirror 315 reflects the incident light of the projected imagery, and the projection screen 310 transmits the reflected light toward the optical reference point. The partially reflective mirror 315 and the projection screen 310 also transmit light from the physical environment toward the optical reference point.

In some embodiments, the partially reflective mirror 315 has a positive refractive power, which permits the optical reference point to be positioned closer to the partially reflective mirror 315. In this way, the optical arrangement 300 may provide a larger field of view 320 for displaying virtual elements, which improves the immersive nature of the AR-capable device in which the optical arrangement 300 is included. Additionally, the optical arrangement 300 may be made more compact, which tends to provide a smaller moment (e.g., corresponding to a strain on the neck or upper body) than a larger implementation. A compact implementation may also reduce manufacturing costs through reduced material and process requirements. A compact implementation may also be more aesthetically pleasing for users, when compared with a large or bulky implementation.

Figure 4:
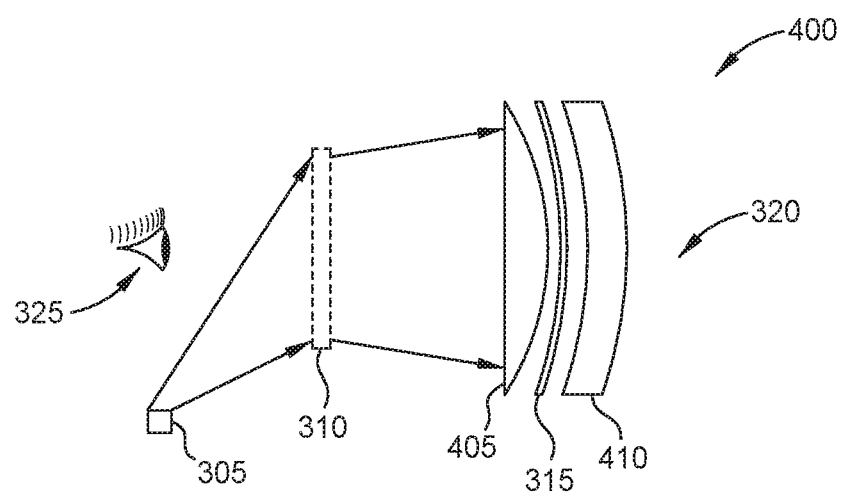
FIG. 4 illustrates an exemplary optical arrangement with a reflective element arranged between lenses, according to one or more embodiments.

FIG. 4 illustrates an exemplary optical arrangement 400 with a reflective element arranged between lenses, according to one or more embodiments. The features of the optical arrangement 400 may be used in conjunction with other embodiments.

The optical arrangement 400 comprises the projector 305, the projection screen 310, and the partially reflective mirror 315. The optical arrangement 400 further comprises a first lens 405 arranged between the projection screen 310 and the partially reflective mirror 315, and a second lens 410 arranged on an opposing side of the partially reflective mirror 315 from the first lens 405. The first lens 405 has a positive refractive power, and the second lens 410 has a negative refractive power. In some embodiments, the positive refractive power of the first lens 405 has a same magnitude as the negative refractive power of the second lens 410. The first lens 405 is shown as a plano-convex lens, although other implementations of the first lens 405 are also contemplated. The second lens 410 is shown as a meniscus lens, although other implementations of the second lens 410 are also contemplated.

As discussed above, the projection screen 310 preferentially scatters light from the projected imagery toward the partially reflective mirror 315. The light of the projected imagery is transmitted in a first pass through the first lens 405, is reflected by the partially reflective mirror 315, is transmitted in a second pass through the first lens 405, and is transmitted through the projection screen 310 to the optical reference point. Environmental light is transmitted through the second lens 410, the partially reflective mirror 315, the first lens 405, and the projection screen 310 to the optical reference point.

Due to the refractive power of the first lens 405 and/or the partially reflective mirror 315, the optical reference point may be positioned closer to the partially reflective mirror 315. In this way, the optical arrangement 400 may provide a larger field of view 320 for displaying virtual elements, which improves the immersive nature of the AR-capable device in which the optical arrangement 400 is included. Additionally, the optical arrangement 400 may be made more compact, which can be beneficial for the reasons discussed above.

Figure 5:
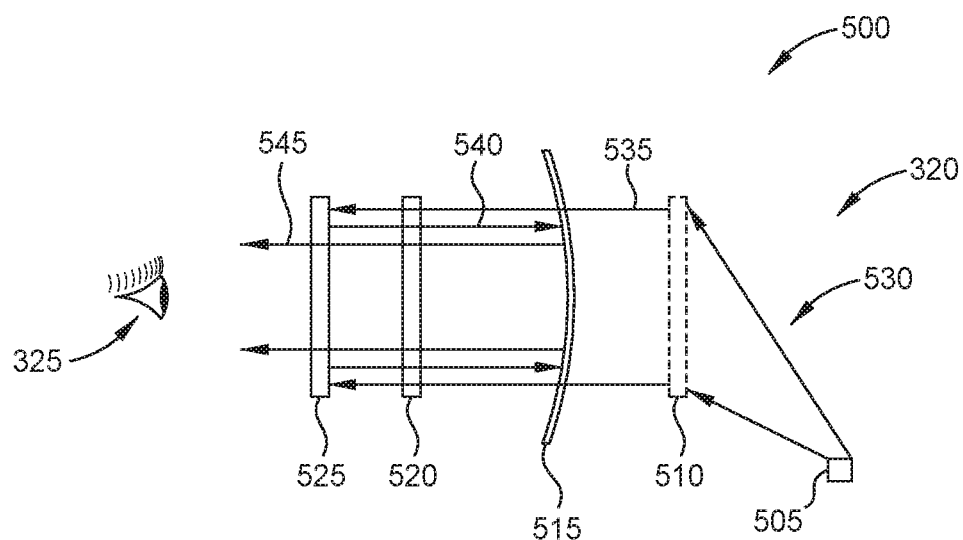
FIG. 5 illustrates an exemplary optical arrangement for projecting polarized imagery, according to one or more embodiments.

FIG. 5 illustrates an exemplary optical arrangement 500 for projecting polarized imagery, according to one or more embodiments. The features of the optical arrangement 500 may be used in conjunction with other embodiments. For example, the optical arrangement 500 represents one example implementation of the optical arrangement 230, in which the reflective element 245 is arranged between the projection screen 240 and the optical reference point.

The optical arrangement 500 comprises a projector 505, a substantially transparent projection screen 510, a partially reflective mirror 515, a quarter-wave retarder 520, and a circular-polarized filter 525. The projector 505 represents one example of the display 235 of FIG. 2, the projection screen 510 represents one example of the projection screen 240, and the partially reflective mirror 515 represents one example of the reflective element 245. The projection screen 510, the partially reflective mirror 515, the quarter-wave retarder 520, and the circular-polarized filter 525 collectively define the field of view 320 of the optical arrangement 500 relative to an optical reference point, which is shown in FIG. 5 as the eye 325.

In some embodiments, the projector 505 comprises one of a polarized LCD and a polarized laser source, although other suitable implementations of the projector 505 are also contemplated. The projector 505 is arranged outside the field of view 320, and projects polarized imagery 530 toward the projection screen 510. Further, as discussed above with respect to FIG. 2, the projector 505 may comprise one or both of asymmetric aspheric optics, and optics having a f-number that is greater than a threshold value.

The projection screen 510 comprises optical elements that preferentially scatter light such that a majority of the polarized imagery 530 is directed toward the partially reflective mirror 515, towards the optical reference point. The projection screen 510 preserves a polarization of the polarized imagery 530, such that the transmitted light 535 from the projection screen 510 has a same polarization as the polarized imagery 530. In some embodiments, the polarized imagery 530 and the transmitted light 535 are plane-polarized light.

The transmitted light 535 passes through the partially reflective mirror 515 and the quarter-wave retarder 520. In some embodiments, the quarter-wave retarder 520 transforms the polarization of the plane-polarized light to a left-circular polarized light. When the left-circular polarized light is incident on the circular-polarized filter 525 (here, a right-circular polarized filter), right-circular polarized light is reflected as reflected light 540 toward the quarter-wave retarder 520. The quarter-wave retarder 520 transforms the polarization of the right-circular polarized light to plane-polarized light (with a plane of polarization that is orthogonal to the plane of polarization of the polarized imagery 530 and the transmitted light 535.

The plane-polarized light is reflected by the partially reflective mirror 515 as reflected light 545. The reflected light 545 is incident on the quarter-wave retarder 520, which transforms the polarization of the plane-polarized light to a right-circular polarized light. When the right-circular polarized light is incident on the circular-polarized filter 525, the right-circular polarized light is transmitted to the optical reference point. Environmental light, which is generally not polarized, is transmitted through the projection screen 510, the partially reflective mirror 515, the quarter-wave retarder 520, and the circular polarizing filter 525 to the optical reference point.

In the example above, the circular-polarized filter 525 is described as a right-circular polarized filter. However, in other implementations, the circular-polarized filter 525 may be a left-circular polarized filter. Further, in other implementations of the optical arrangement 500, the projector 505 may project non-polarized imagery, and the polarization-specific elements such as the quarter-wave retarder 520 and the circular-polarized filter 525 may be omitted.

Using the optical arrangement 500, the optical reference point may be positioned closer to the partially reflective mirror 515. In this way, the optical arrangement 500 may provide a larger field of view 320 for displaying virtual elements, which improves the immersive nature of the AR-capable device in which the optical arrangement 500 is included. Additionally, the optical arrangement 500 may be made more compact, which can be beneficial for the reasons discussed above.

Figure 6:
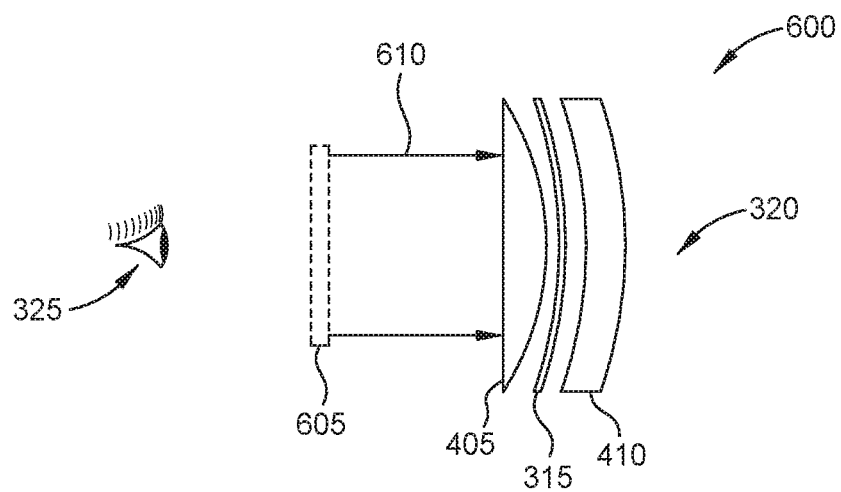
FIG. 6 illustrates an exemplary optical arrangement with a substantially transparent display, according to one or more embodiments.

FIG. 6 illustrates an exemplary optical arrangement 600 with a substantially transparent display 605, according to one or more embodiments. The features of the optical arrangement 600 may be used in conjunction with other embodiments. For example, the optical arrangement 600 represents one example implementation of the optical arrangement 230, in which the substantially transparent display 605 is arranged within the field of view 320 of the optical arrangement 600.

The optical arrangement 600 comprises the substantially transparent display 605, the first lens 405, the partially reflective mirror 315, and the second lens 410. In some embodiments, the substantially transparent display 605 is one of an OLED, a side-lit LCD, and a naturally-lit LCD, although other implementations are also contemplated.

The first lens 405 is arranged between the substantially transparent display 605 and the partially reflective mirror 315, and the second lens 410 is arranged on an opposing side of the partially reflective mirror 315 from the first lens 405. The first lens 405 has a positive refractive power, and the second lens 410 has a negative refractive power. In some embodiments, the positive refractive power of the first lens 405 has a same magnitude as the negative refractive power of the second lens 410 such that light from the environment is not substantially affected.

The substantially transparent display 605 displays imagery 610 toward the first lens 405, which is transmitted in a first pass through the first lens 405, reflected by the partially reflective mirror 315, and transmitted in a second pass through the first lens 405 as collimated light. The intensity of the collimated light is greater than any back-scattered light from the substantially transparent display 605, and will also be at a different focal distance. As a result, the substantially transparent display 605 will be less conspicuous at the optical reference point compared to the virtual imagery of the collimated light that is combined with environmental light that is transmitted to the optical reference point essentially unrefracted.

Due to the refractive power of the first lens 405 and/or the partially reflective mirror 315, the optical reference point may be positioned closer to the partially reflective mirror 315. In this way, the optical arrangement 600 may provide a larger field of view 320 for displaying virtual elements, which improves the immersive nature of the AR-capable device in which the optical arrangement 600 is included. Additionally, the optical arrangement 600 may be made more compact, which can be beneficial for the reasons discussed above.

Figure 7:
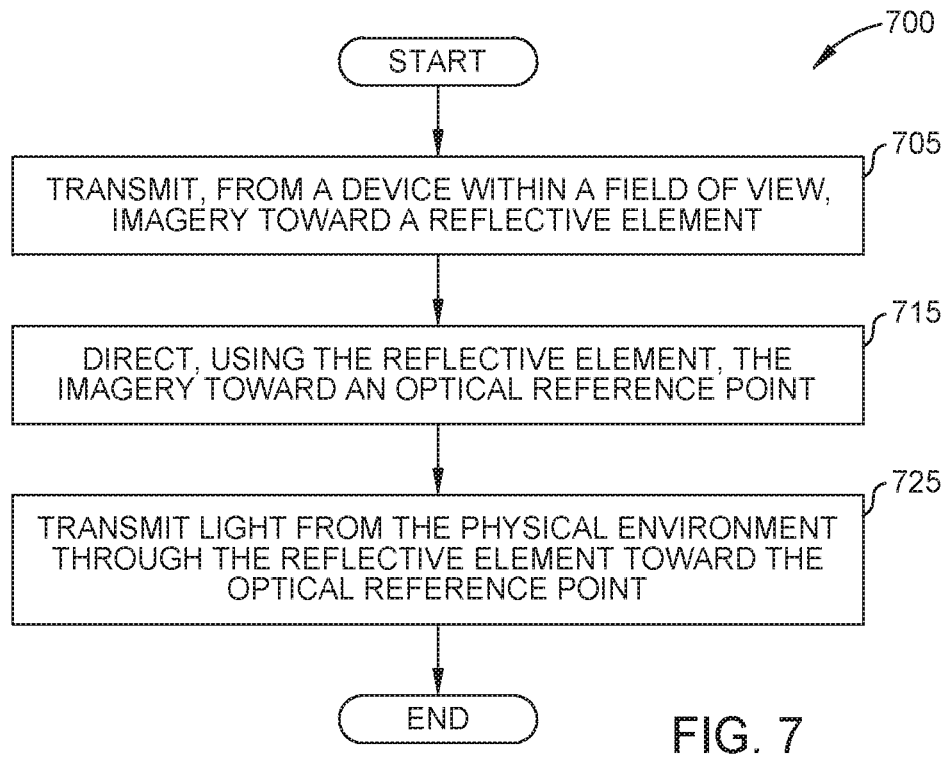
FIG. 7 is an exemplary method for use with an AR-capable headset, according to one or more embodiments.

FIG. 7 is an exemplary method 700 for use with an AR-capable headset, according to one or more embodiments. The method 700 may be used in conjunction with other embodiments, such as any of the different optical arrangements 300, 400, 500, 600 described above.

The method 700 begins at block 705, wherein imagery is transmitted toward a reflective element from a device arranged within a field of view of the optical arrangement. In some embodiments, the device within the field of view is a substantially transparent projection screen. In other embodiments, the device within the field of view is a substantially transparent display.

At block 715, the reflective element directs the imagery toward an optical reference point of the optical arrangement. In some embodiments having a projection screen or a substantially transparent display between the optical reference point and the reflective element, the reflective element reflects the imagery toward the projection screen or the substantially transparent display. In some embodiments, the imagery is transmitted in a first pass through a first lens having a positive refractive power, reflected by the reflective element, and transmitted in a second pass through the first lens.

In other embodiments having the reflective element between a projection screen and the optical reference point, the reflective element transmits the imagery away from the projection screen toward the optical reference point.

At block 725, light from the physical environment is transmitted through the reflective element toward the optical reference point. In some embodiments, the reflective element comprises a partially reflective mirror that has a positive refractive power. The method 700 ends following completion of block 725.

Figure 8:
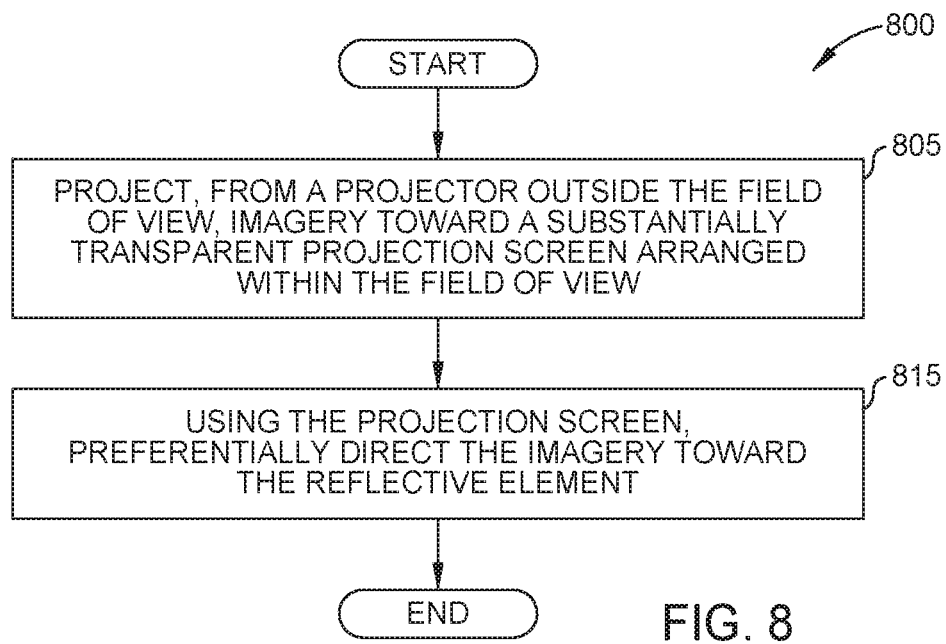
FIG. 8 is an exemplary method of transmitting imagery toward a reflective element within a field of view, according to one or more embodiments.

FIG. 8 is an exemplary method 800 of transmitting imagery toward a reflective element within a field of view, according to one or more embodiments. The method 800 may be used in conjunction with other embodiments, such as being performed as part of block 705 of FIG. 7.

The method 800 begins at block 805, where a projector outside the field of view of the optical arrangement projects imagery toward a substantially transparent projection screen arranged within the field of view. In some embodiments, projecting the imagery comprises projecting the imagery through optics such as asymmetric aspheric optics, and optics having an f-number that is greater than a threshold value.

At block 815, the imagery is preferentially directed toward the reflective element using the projection screen. In some embodiments, the projection screen comprises one of nano-optical elements, a volume hologram, embossed diffractive optical elements, refractive prisms, and refractive lenslets that preferentially direct the imagery. The method 800 ends following completion of block 815.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An optical arrangement defining a field of view relative to an optical reference point, the optical arrangement comprising:
    a reflective element and a refractive element, wherein the reflective element is arranged within the field of view;
    an off-axis, short-throw projector arranged outside the field of view; and
    a substantially transparent projection screen arranged within the field of view and configured to:
        preferentially direct imagery projected by the off-axis, short-throw projector toward the reflective element;
        before direction by the reflective element, transmitting the imagery in a first pass through the refractive element; and
    after direction by the reflective element, transmit the imagery in a second pass through the refractive element and toward the optical reference point.

2. The optical arrangement of claim 1, wherein the reflective element comprises a partially reflective mirror configured to transmit light from a physical environment toward the optical reference point.

3. The optical arrangement of claim 1, wherein the projection screen is arranged between the reflective element and the optical reference point.

4. The optical arrangement of claim 3, wherein the reflective element comp is, be mounted, Rises a partially reflective mirror configured to transmit light from a physical environment toward the optical reference point, the refractive element comprising a first lens arranged between the projection screen and the partially reflective mirror, the first lens having a positive refractive power, wherein the optical arrangement further comprises:
    a second lens arranged on an opposing side of the partially reflective mirror from the first lens, the second lens having a negative refractive power with a same magnitude as the positive refractive power of the first lens, wherein the partially reflective mirror has a positive refractive power.

5. The optical arrangement of claim 1, wherein the reflective element is arranged between the projection screen and the optical reference point.

6. An optical arrangement defining a field of view relative to an optical reference point, the optical arrangement comprising:
    a reflective element arranged between a projection screen and the optical reference point;
    an off-axis, short-throw projector arranged outside the field of view and configured to project imagery having a measure of polarization;
    the projection screen, which is arranged within the field of view, wherein the projection screen is substantially transparent and is configured to:
        preferentially direct the imagery projected by the off-axis, short-throw projector toward the reflective element; and
        after direction by the reflective element, transmit the imagery toward the optical reference point, wherein the measure of polarization is substantially preserved by the projection screen;
    a circular-polarized filter between the reflective element and the optical reference point; and
    a quarter-wave retarder between the reflective element and the circular-polarized filter.

7. The optical arrangement of claim 1, wherein the off-axis, short-throw projector comprises one of:
    a liquid crystal on silicon (LCOS) display; and
    a deformable mirror device (DMD).

8. The optical arrangement of claim 7, wherein the off-axis, short-throw projector further comprises one or both of:
    asymmetric aspheric optics; and
    optics having an f-number greater than a threshold value.

9. The optical arrangement of claim 1, wherein the projection screen comprises one of:
    nano-optical elements;
    a volume hologram;
    embossed diffractive optical elements;
    refractive prisms; and
    refractive lenslets.

10. An augmented reality (AR)-capable headset comprising:
    one or more visual sensors;
    one or more computer processors communicatively coupled with the one or more visual sensors; and
    an optical arrangement defining a field of view relative to an optical reference point, the optical arrangement comprising:
        a reflective element and a refractive element, wherein the reflective element is arranged within the field of view;
        an off-axis, short-throw projector arranged outside the field of view and communicatively coupled with the one or more computer processors; and
        a substantially transparent projection screen arranged within the field of view and configured to:
            preferentially direct imagery projected by the off-axis, short-throw projector toward the reflective element;
            before direction by the reflective element, transmitting the imagery in a first pass through the refractive element; and
            after direction by the reflective element, transmit the imagery in a second pass through the refractive element and toward the optical reference point.

11. The AR-capable headset of claim 10, wherein the reflective element comprises a partially reflective mirror configured to transmit light from a physical environment toward the optical reference point.

12. The AR-capable headset of claim 10, wherein the projection screen is arranged between the reflective element and the optical reference point.

13. The AR-capable headset of claim 10, wherein the reflective element is arranged between the projection screen and the optical reference point.

14. The AR-capable headset of claim 10, wherein the off-axis, short-throw projector comprises one of:
    a liquid crystal on silicon (LCOS) display; and
    a deformable mirror device (DMD).

15. The AR-capable headset of claim 10, wherein the projection screen comprises one of:
    nano-optical elements;
    a volume hologram;

embossed diffractive optical elements;
refractive prisms; and
refractive lenslets.

16. A method for use with an augmented reality (AR)-capable headset defining a field of view relative to an optical reference point, the method comprising:
projecting, from an off-axis, short-throw projector outside the field of view, imagery toward a substantially transparent projection screen arranged within the field of view;
using the projection screen, preferentially directing the imagery toward a reflective element arranged within the field of view;
before direction by the reflective element, transmitting the imagery in a first pass through the refractive element;
directing, using the reflective element, the imagery toward the optical reference point; and
after direction by the reflective element, transmitting the imagery in a second pass through the refractive element.

17. The method of claim 16, wherein directing the imagery toward the optical reference point comprises:
reflecting, using the reflective element, the imagery toward the projection screen; and
transmitting the reflected imagery through the projection screen toward the optical reference point.

18. The method of claim 16, further comprising:
transmitting light from a physical environment through the reflective element and through the projection screen toward the optical reference point.

19. The method of claim 16,
wherein the refractive element comprises a first lens having a positive refractive power.

20. The method of claim 19, wherein the reflective element comprises a partially reflective mirror that transmits light from a physical environment toward the optical reference point, and
wherein the partially reflective mirror has a positive refractive power.

21. The method of claim 20, wherein the off-axis, short-throw projector and the projection screen in combination permit the reflective element to be positioned closer to a user of the AR-capable headset by avoiding fold optics, thereby increasing the field of view defined by the AR-capable headset;
wherein the partially reflective mirror has the positive refractive power in order to permit the optical reference point to be positioned closer to the partially reflective mirror, thereby further increasing the field of view defined by the AR-capable headset.

* * * * *

UNITED STATES PATENT AND TRADEMARK OFFICE
CERTIFICATE OF CORRECTION

| | |
|---|---|
| PATENT NO. | : 11,480,794 B2 |
| APPLICATION NO. | : 16/781899 |
| DATED | : October 25, 2022 |
| INVENTOR(S) | : Eric C. Haseltine et al. |

It is certified that error appears in the above-identified patent and that said Letters Patent is hereby corrected as shown below:

In the Specification

In Column 9, Line 29, delete "535." and insert -- 535). --.

In the Claims

In Column 13, Line 38, in Claim 4, delete "comp is, be mounted, Rises" and insert -- comprises --.

Signed and Sealed this
Fourteenth Day of March, 2023

Katherine Kelly Vidal
*Director of the United States Patent and Trademark Office*